Oct. 14, 1952 C. E. MONGAN, JR 2,613,480
APPARATUS FOR TREATING GLASSWARE
Filed Sept. 23, 1942
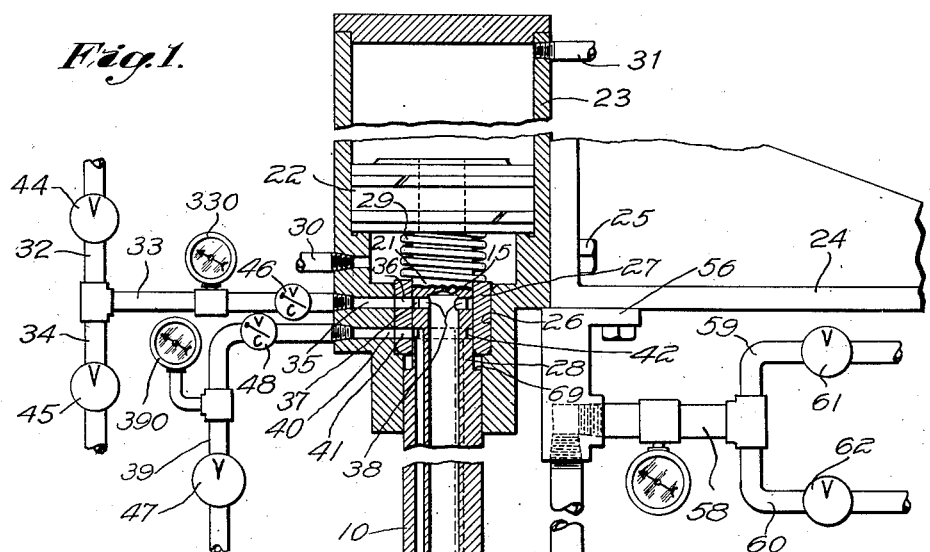
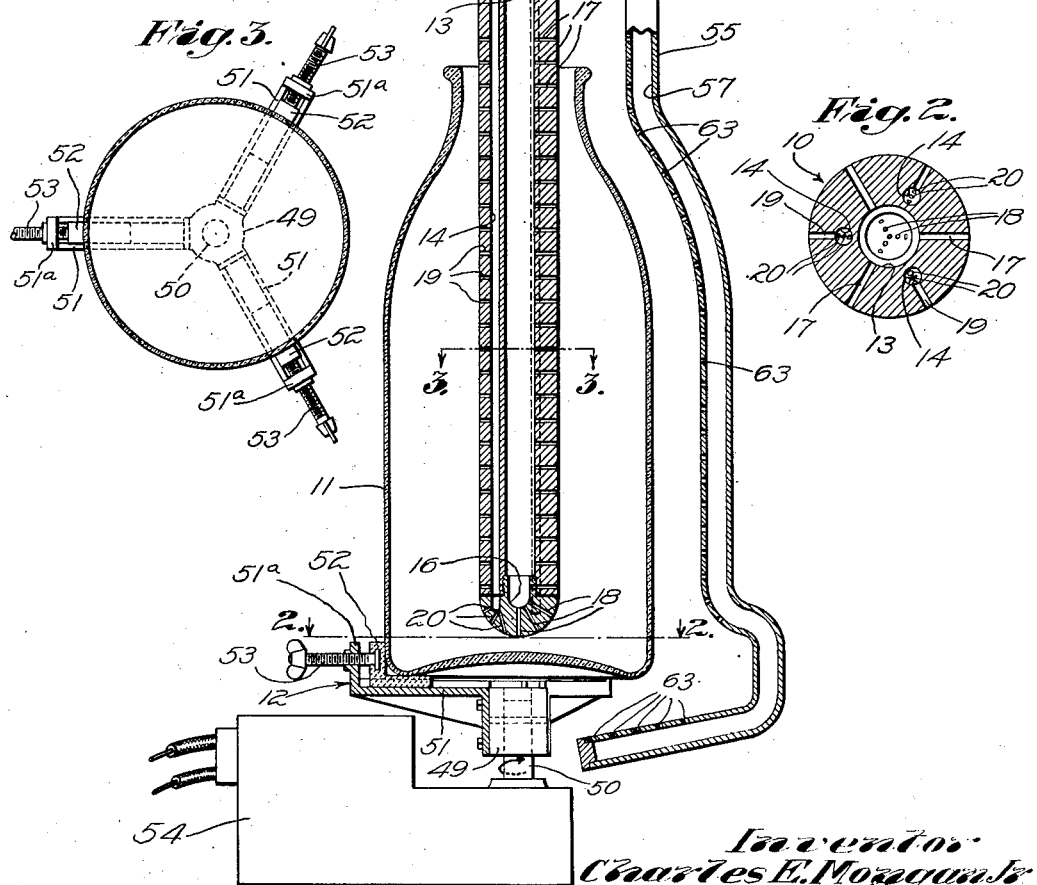
Witness
W. B. Thayer
Inventor
Charles E. Mongan Jr.
by Brown & Parham
Attorneys Patented Oct. 14, 1952

2,613,480

UNITED STATES PATENT OFFICE 2,613,480

APPARATUS FOR TREATING GLASSWARE

Charles E. Mongan, Jr., Hartford, Conn., assignor to Emhart Manufacturing Company, a corporation of Delaware Application September 23, 1942, Serial No. 459,362

2 Claims. (Cl. 49—45)

This invention relates to improvements in apparatus for treating glassware, especially to improve the strength thereof.

The present invention provides novel means for surface-treating bottles or other hollow glass articles to strengthen the walls thereof.

According to the present invention, jets of flame may be applied to the internal and external surfaces of each bottle or other hollow glass article that is to be treated to fire polish such surfaces and thereby eradicate minute or incipient fissures, checks and other surface irregularities. The jets of flame may be discontinued or reduced to the desired extent when the fire polishing has been effected and the glass article may be chilled rapidly at its surfaces as required to effect tempering of such article. The outer and inner surface layers of the wall of the tempered article will be under compression and the glass intermediate such surface layers will be in tension.

The invention may be used advantageously to treat newly made glassware on the removal of such glassware from a forming machine by which it was made and while the glassware retains considerable heat incident to its manufacture. Such an article may require little, if any, externally applied heating to bring its temperature sufficiently above the strain point of the glass thereof to adapt the article to be tempered by the application of a suitable chilling medium, such as air, to the inner and outer surfaces thereof. Some redistribution of the heat of manufacture in the wall of a newly made article may be desirable to bring about a more uniform temperature condition throughout such wall prior to the application of a chilling fluid medium thereto. The jets of flame applied to the surfaces of such wall to fire polish them aids such redistribution by preventing differential radiation of heat from different portions of such wall and by applying heat to the surfaces thereof. If the articles to be tempered have been cooled to room temperature or to any other temperature below that at which it is desired to start the tempering operation, this being a temperature substantially above that of the strain point of the glass, the jets of flame may be applied to the surfaces of the wall of the article for the time and with the intensity required to heat the glass of such wall to the starting temperature desired before the glass chilling operation is commenced.

The present invention obviates factors resulting from minute fissures, checks and faults in the surface portions of the walls of glass articles that are to be tempered and makes such surfaces more smooth and regular and thus tends to make the tempered articles stronger than would be the case were these fissures, checks, faults and surfaces irregularities present during the chilling of such walls to effect tempering thereof. The fire polishing also tends to improve the appearance of the surfaces of the tempered articles.

Further objects and advantages of the invention will hereinafter be pointed out or will become apparent from the following description of an illustrative embodiment of the invention as shown in the accompanying drawings, in which:

Figure 1 is a view, mainly in vertical section and partly in side elevation, of a device for applying jets of flame and of chilling fluid to the internal and external surfaces of a hollow glass article;

Fig. 2 is a section along the line 3—3 of Fig. 1; and

Fig. 3 is a section along the line 2—2 of Fig. 1.

An illustrative device of simple construction, as shown in Fig. 1, comprises a nozzle 10 which is shown depending centrally within an upright article of glassware, such as the bottle 11, carried by a rotary holder 12. The nozzle 10 is of sufficient length to extend from a level above that of the open upper end or mouth of the bottle nearly to the bottom thereof. The nozzle is shown as having a longitudinally extending central passage 13 and one or more (three in the example shown) additional longitudinally extending passages 14. The longitudinally extending central passage 13 may be closed at its rearward end, which in the example shown is uppermost, as at 15, Fig. 1, and also, as at 16, at its forward end, which in this case is at the lower free end portion of the nozzle. Jet holes 17 extend from the central passage 13 laterally through the side wall of the hollow nozzle at predetermined places circumferentially and longitudinally of the nozzle. Additional jet holes, as indicated at 18, may extend from the lower end of the central passage 13 through the wall of the nozzle at the bottom or free end thereof.

The longitudinally extending passages 14 are shown as being of smaller area in cross section than the passage 13 and as being located in the wall of the nozzle at places which are spaced regularly about the longitudinal axis of the nozzle and are radially outward from the central passage 13. The longitudinal passages 14, like the longitudinal passage 13, may be closed at their rearward (upper) and forward (lower) ends and each may be provided at intervals along its length with spaced jet holes 19 extending radially outward therefrom to the outer periphery of the nozzle and with further jet holes, as indicated at 20, Fig. 1, in the lower or bottom end wall of the nozzle.

As hereinafter will be explained, a mixture of a combustible fluid and air may be supplied to the central passage 13 and jets of flame applied from the jet holes 17 and 18 to the inner surface of the bottle. Air may be supplied through the longitudinal passages 14 and the jet holes 19 and 20 to support combustion within the bottle and subsequently the supply of combustible fluid may be cut off and air continued from all the jet holes to chill the wall of the bottle at its inner surface.

The nozzle 10 may be connected at its upper end, as by a piston rod 21, to a piston 22 which is reciprocable in a vertical cylinder 23. The cylinder 23 may be carried by a support 24, to which it may be attached in any suitable manner, as by cap bolts such as that indicated at 25.

The lower head of the cylinder 23 may comprise a counterbored tubular portion 26 adapted to accommodate a sleeve 27 which is mounted on the upper end portion of the nozzle 10 for movement with the latter and also for a limited axial movement relative to the nozzle. As shown, the sleeve 27 is slidable on a reduced portion 28 of the nozzle. A coil spring 29 encircles the piston rod between the upper end of the sleeve 27 and the piston 22 and tends to urge the sleeve 27 axially along the nozzle toward a limit shoulder 69 at the lower end of the reduced portion 28 thereof. The function of this assembly will presently be pointed out.

Operating fluid under pressure may be supplied to and exhausted from the lower portion of the cylinder 23 through a pipe 30 and to and from the upper portion of the cylinder through a pipe 31.

A combustible fluid, such as gas, may be supplied by a pipe 32 to a mixing pipe 33 with which an air supply pipe 34 also is connected. The pipe 33 may be connected to the lower head portion 26 of the cylinder 23 so as to supply a combustible mixture of the air and gas to a passage 35. The passage 35 is in register with a radial port 36 in the sleeve 27 when the piston 22 is at the lower end of its stroke in the cylinder and the sleeve 27 is in contact at its lower end with the shoulder at the lower end of the counterbore in the lower head portion 26 of the cylinder, as illustrated in Fig. 1. The port 36 in the sleeve 27 communicates through an annular groove or passage 37 at the periphery of the nozzle 10 with radial ports 38 which extend through the wall of the nozzle to the upper end portion of the central passage 13 therein.

An air supply pipe 39 is connected to the lower head portion 26 of the cylinder 23 to supply air to a radial passage 40 in such head portion. When the parts are in the positions shown in Fig. 1, the passage 40 is in register with a radial port 41 in the sleeve valve 27. The port 41 communicates through an external annular groove or passage 42 in the nozzle 10 with the respective longitudinal passages 14.

The pipes 32 and 34 may be provided with valves 44 and 45, respectively, for controlling flow of fluids therethrough. These are shown diagrammatically. They may be manually operable. A suitable check valve 46 may be provided in the mixing pipe 33. A fluid flow control valve 47 may be provided in the air pipe 39. Such pipe also may be provided with a suitable check valve 48. The pipes 33 and 39 may be provided with suitable pressure gauges, 330 and 390, respectively, as shown.

The rotary holder 12 may comprise a hub 49 mounted upon an upstanding rotatable shaft 50 and a plurality of substantially flat supporting arms 51 extending radially outward from the upper end of the hub. To hold the bottle firmly on the holder 12 for rotation therewith, a plurality of cooperative clamping members or jaws 52 may be employed. These may be made of asbestos or other heat resistant material. They may be mounted upon the arms 51 so as to be slid thereon into and out of gripping relation to the lower end portion of the bottle 11 on the support. As shown, screws 53 are threaded through suitable openings in upturned end portions 51ᵃ of the arms 51 and are pivotally connected at their inner ends with the clamping members 52 for moving such members on the arms as required to grip and hold the bottle 11 firmly on the holder 12 or to release such article. The shaft 50 may be the driven shaft of a driving mechanism which is shown diagrammatically at 54 in Fig. 1 as it may be of any suitable known structure.

The structural arrangements just described for supporting and rotating the bottle and for supporting the nozzle in position to depend within the bottle are such as to cause a relative rotation between the bottle and the nozzle about an axis that is approximately coincident with the longitudinal axes of both the bottle and the nozzle. Any other suitable mechanism for effecting this result may be employed.

The invention also contemplates application of flame jets and cooling fluid jets to the outer surface of the glass article 11. To this end, I may provide an external tubular nozzle 55 which may be supported in a depending position at one side of the glass article, as by a bracket 56 attached to the support 24. The tubular nozzle 55 may have an internal passage 57 extending longitudinally thereof. This passage may be closed at its upper and lower ends and may communicate adjacent to its upper end with a gas and air mixer pipe 58. An air supply pipe 59 and a gas supply pipe 60 are connected operatively to the mixer pipe 58. The air pipe 59 may be provided with a suitable control valve 61 and the gas pipe 60 may have a similar control valve 62.

The external nozzle 55 may be bent to conform generally to the external longitudinal contour of the glass article to be treated and so that jet holes 63 in the side of such nozzle next to the glass article will discharge jets of fluid from the passage 57 onto the outer surface of the glass article 11. The number, size and spacing of these jet holes may be predetermined as service conditions seem to require.

The operation of the structure as described will be readily understood. When the inner nozzle 10 is in its lowered, active position within a rotating bottle on the rotating holder 12, as shown in Fig. 1, the valves 44 and 45 will have been opened to the desired extents to supply a desirable combustible mixture of air and gas to the nozzle passage 13 and the jet holes 17 and 18. The valve 47 also may have been opened to the desired extent to provide combustion supporting or secondary air within the bottle for the jets issuing from the holes 17 and 18. The air supplied by the pipe 34 may be at a lower pressure than that supplied by the pipe 39. The jets issuing from the holes 17 and 18 may have been ignited in any suitable way. If the bottle has been transferred directly from its forming machine to the holder 12, these jets will be ignited by the hot glass of the bottle itself. If the bottle is cold when the nozzle 10 is lowered into it, then any usual and available igniting means may be used.

The valves controlling the air and gas supply pipes of the outer nozzle also may have been opened to the desired extents so that a desirable combustible mixture of gas and air will be discharged from the jet holes 63. The jets issuing from these holes also may have been ignited in any suitable way.

With the inner and outer nozzle systems active as just described, the bottle will be subjected throughout its inner and outer surfaces to heat from jets of flame. The jet holes supplying the flame jets to different portions of the wall of the bottle, as to portions of different thickness, may be of different sizes or differently directed so that different jets have different heating effects if such differences are deemed desirable or necessary. If the glass of the bottle wall retains considerable heat incident to its manufacture, but little additional heating thereof by the flame jets may be required to raise the temperature of such glass to the tempering temperature point. This, as aforesaid, is above the strain point of the glass but is not high enough to cause the bottle wall to be deformed or slump objectionably. If the glass article is at a lower temperature when the flame jets are applied thereto, these may be regulated to impart heat to the glass relatively rapidly but not with sufficient intensity to melt the surface glass until the temperature of the glass bottle wall is nearly at the tempering temperature point. The intensity of the flame jets then may be increased for momentary application to the surface of the glass wall to aid the fire polishing effect of such jets as the glass of the wall arrives at its tempering temperature point.

When the glass of the bottle wall has been heated to its tempering temperature point, the combustible fluid or gas control valves may be closed. The valves controlling the flow of air are adjusted, if desirable, to produce the desired chilling effect of the jets of air on the inner and outer surfaces of the wall of the glass bottle. This may involve opening further the valves controlling flow of both the primary and secondary air to the inner nozzle and of the valve controlling the flow air to the outer nozzle.

When the rapid chilling of the glass wall of the bottle to a temperature below its strain point has been effected, the flow of air to the nozzles may be reduced for further cooling of the bottle. When the desired cooling of the bottle has been accomplished, the air control valves may be closed or may be returned to their proper settings for the next fire polishing operation. The piston 22 is caused to move upwardly in its cylinder to raise the nozzle 10 from the bottle. The rotation of the holder 12 may be stopped and the bottle released from and removed from such holder. It will be noted that the spring 29, Fig. 1, will hold the sleeve 27 down against its support during the initial part of the upward movement of the nozzle so that communication between the passages in the nozzle 10 and the ports of the sleeve will be cut off before the sleeve is moved upwardly into the cylinder by further upward movement of the nozzle and its piston. This is to prevent entrance of operating fluid from the cylinder into the internal passages of the nozzle when the latter is raised.

Various changes in and modifications of the illustrative simple form of structure shown in the drawings will readily occur to those skilled in the art and I therefore do not wish to be limited to the details of the device as illustrated and as herein particularly described.

I claim:

1. In apparatus for surface treating a glass bottle or like hollow glass article, an elongate nozzle comprising means defining a longitudinally extending passage having a series of spaced holes in its wall and another longitudinally extending passage extending alongside the first passage and also having a series of holes in its wall, said nozzle being adapted to project into a hollow glass article to be treated nearly to the bottom of such article, means operatively connected with said first named passage to supply a mixture of air and a combustible gas under pressure thereto, valve means operable to independently control the supply of gas and air components respectively, of said mixture and to shut off the supply of combustible gas to said first named passage while continuing to supply air thereto, and means to supply air under pressure to said second named longitudinal passage.

2. Apparatus as specified by claim 1 and, in addition, an outer elongate nozzle spaced from said first nozzle so as to be adapted to extend alongside the hollow glass article into which the first named nozzle projects, said outer nozzle having a longitudinally extending passage therein provided with spaced holes in the wall thereof next to the hollow glass article, means for supplying a mixture of air and combustible gas under pressure to the passage of said outer nozzle, and means for independently controlling the supply of the air and gas components of the last named mixture so that said gas component may be shut off while the supply of the air component to the last named passage is continued.

CHARLES E. MONGAN, Jr.

REFERENCES CITED

The following references are of record in the file of this patent:

UNITED STATES PATENTS

| Number | Name | Date |
| --- | --- | --- |
| 397,593 | Hassman | Feb. 12, 1889 |
| 842,233 | McLane | Jan. 29, 1907 |
| 962,863 | Sanford | June 28, 1910 |
| 2,106,193 | Sloan | Jan. 25, 1938 |
| 2,180,737 | Hess | Nov. 21, 1939 |
| 2,194,760 | Long | Mar. 26, 1940 |
| 2,197,550 | Hinsey | Apr. 16, 1940 |
| 2,209,252 | Stewart et al. | July 23, 1940 |
| 2,218,827 | Mott et al. | Oct. 22, 1940 |
| 2,223,124 | Owen | Nov. 26, 1940 |
| 2,269,060 | Mitford | Jan. 6, 1942 |
| 2,275,155 | Mongan, Jr. | Mar. 3, 1942 |
| 2,309,290 | Aksomitas | Jan. 26, 1943 |
| 2,361,484 | Lansinger | Oct. 31, 1944 |
| 2,403,761 | Shorter | July 9, 1946 |